Nov. 17, 1953 — R. M. BOTLEY — 2,659,495
CAN STACKER AND UNSTACKER
Filed June 23, 1950 — 6 Sheets-Sheet 1

Inventor:
Richard M. Botley
by
Attorney

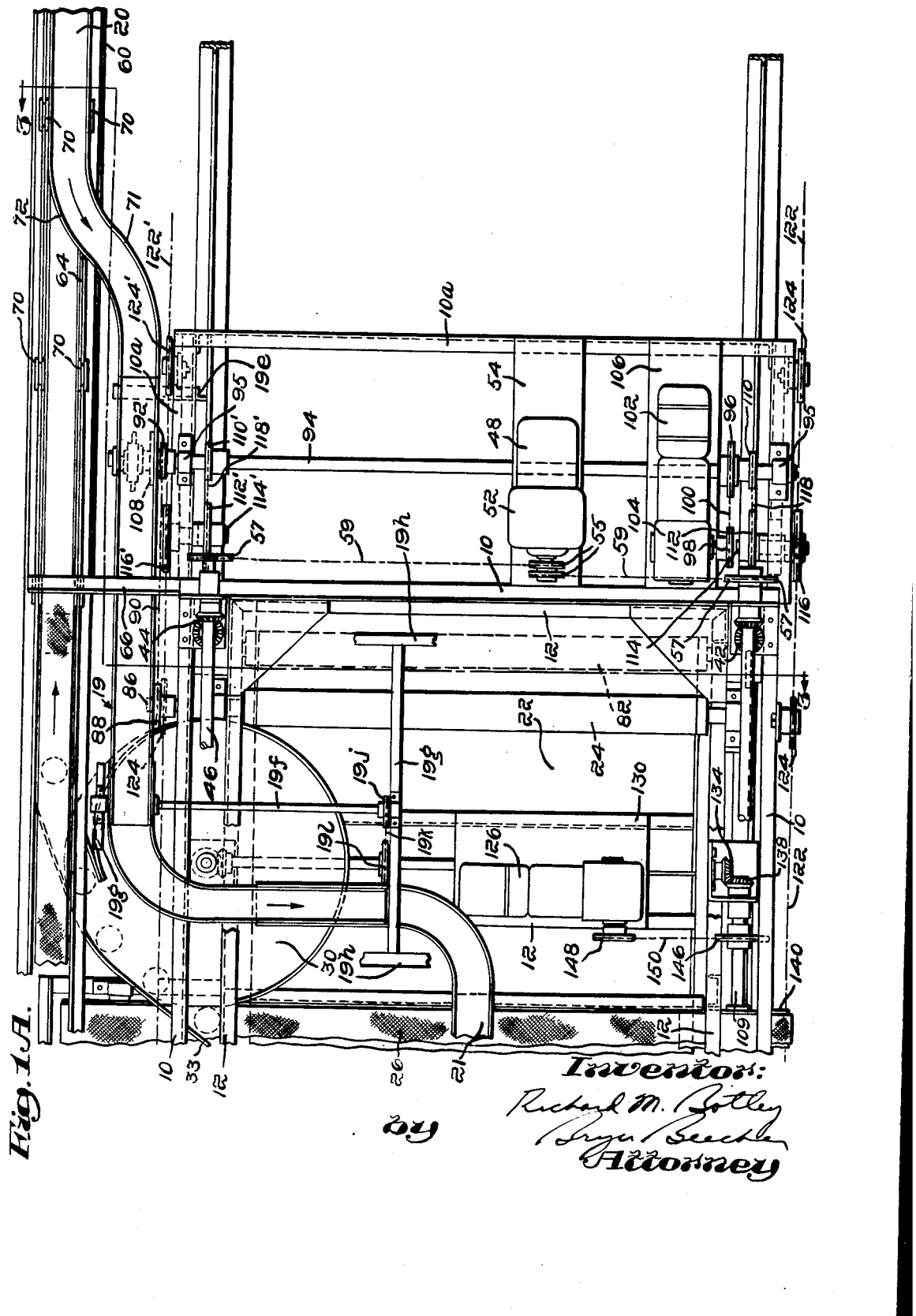

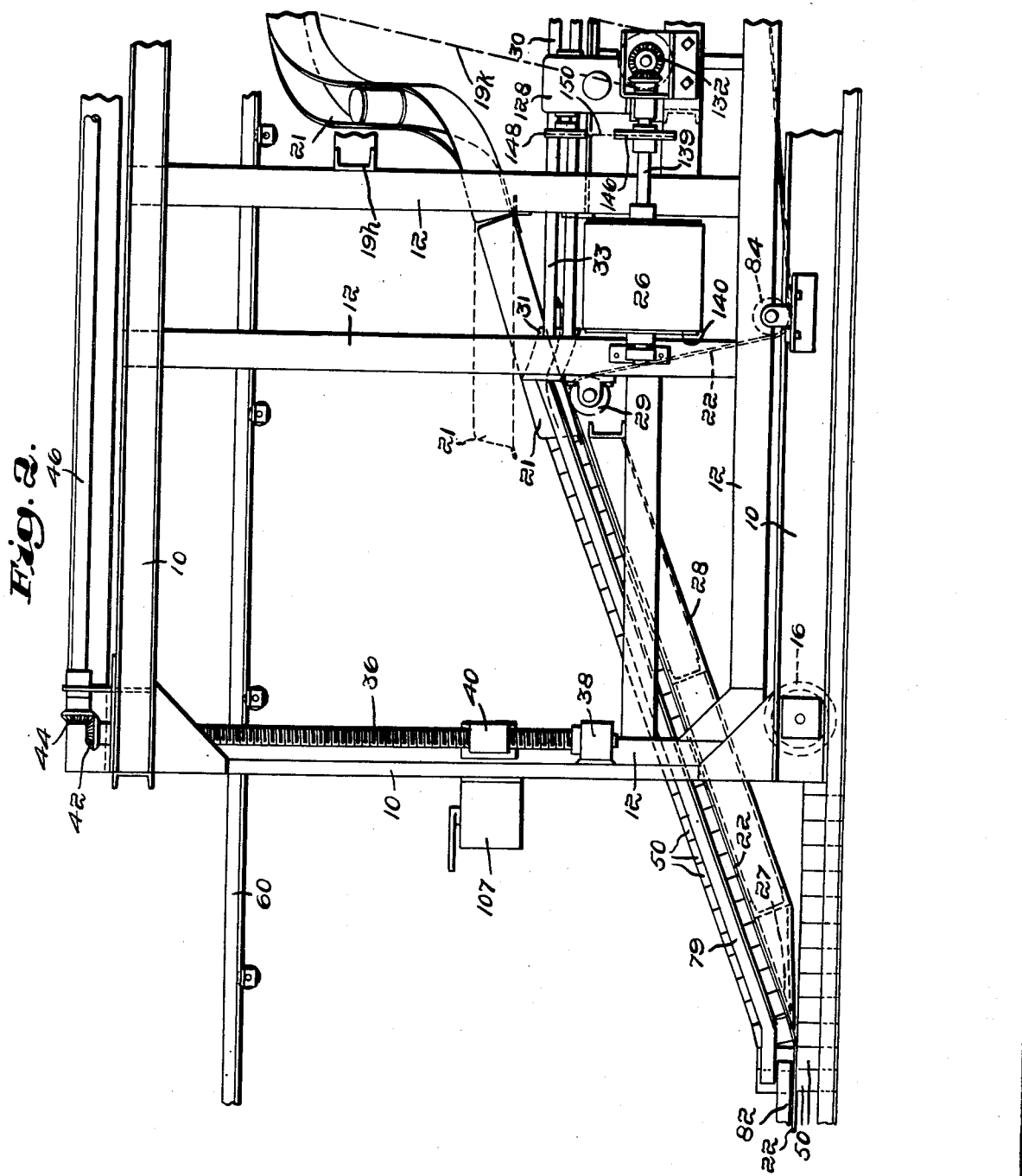

Nov. 17, 1953     R. M. BOTLEY     2,659,495
CAN STACKER AND UNSTACKER

Filed June 23, 1950     6 Sheets-Sheet 4

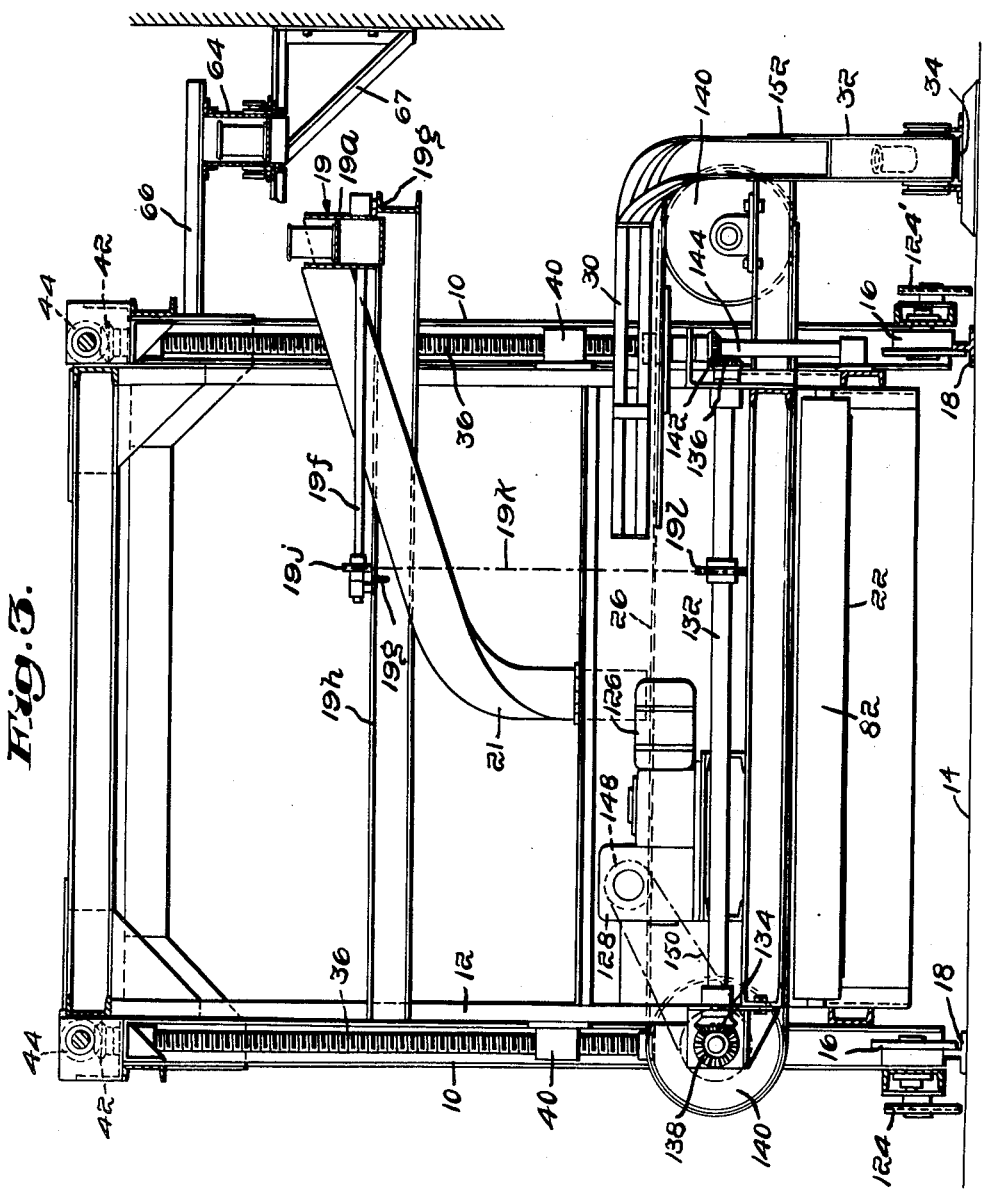

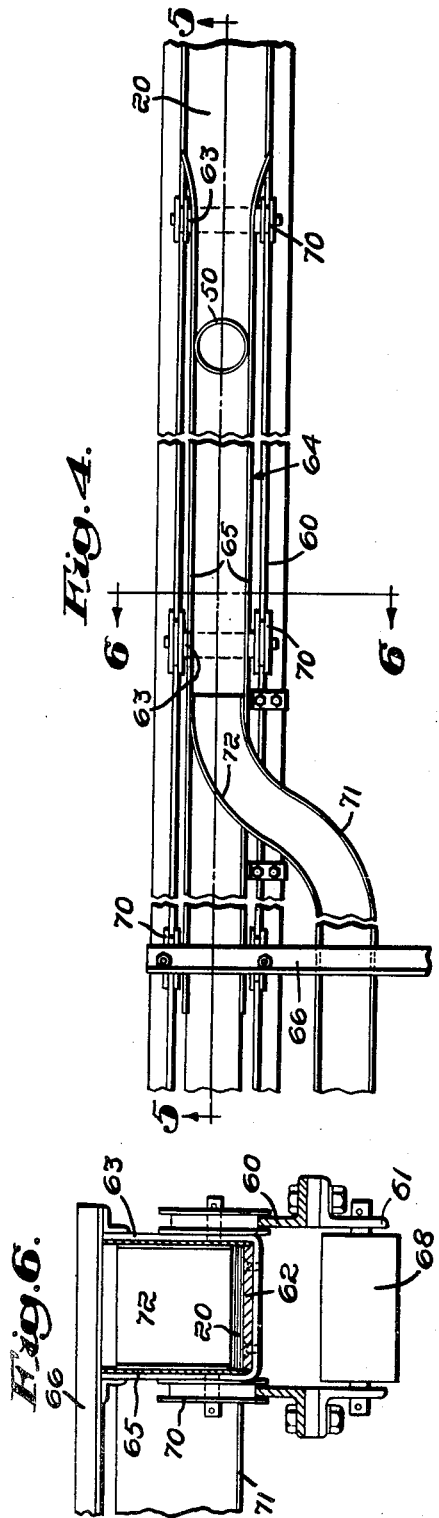
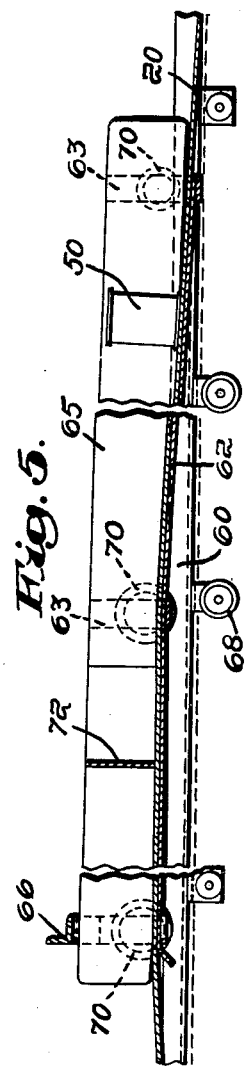

Patented Nov. 17, 1953

2,659,495

UNITED STATES PATENT OFFICE 2,659,495

CAN STACKER AND UNSTACKER

Richard M. Botley, Honolulu, Territory of Hawaii, assignor to Hawaiian Pineapple Company, Limited, Honolulu, Territory of Hawaii, a corporation of Hawaii Application June 23, 1950, Serial No. 169,930

19 Claims. (Cl. 214—6)

My invention concerns a machine for stacking and unstacking objects adapted for stacking in tiers or layers and more particularly concerns a machine for stacking and unstacking sealed cans.

Heretofore, it has been the practice to store sealed cans either in solid stacks using hand labor or on trays by means of portable lift trucks. Both of these methods are unsatisfactory; the former because of labor costs, the latter because it represents uneconomic utilization of warehouse space.

My invention has as a principal object to provide a can stacker and unstacker which does not demand the use of trays, yet is essentially automatic in operation.

A further object is to provide such a machine which is adapted for use in warehouses in which the floors are divided into bays delineated by rows of pillars or building columns.

A still further object is to provide a machine of the type indicated which is capable of substantially completely filling such a bay with one continuous unbroken stack of cans.

Other objects of the invention will appear from the following detailed description of a preferred embodiment thereof. The description will proceed with reference to the accompanying drawings which, while to some extent diagrammatic, accurately represent the particular machine. In the drawings, Figs. 1 and 1A show the machine as it appears in plan, certain parts shown in Fig. 1 being repeated in Fig. 1A for convenience;

Figs. 2 and 2A show the machine in side elevation; and

Fig. 3 is a section on the line 3—3 of Fig. 1A.

Fig. 4 is a detail in plan of a novel can sidetracking device used in the machine;

Fig. 5 is a section on the line 5—5 of Fig. 4; and

Fig. 6 is a section on the line 6—6 of Fig. 4.

Figure 1:
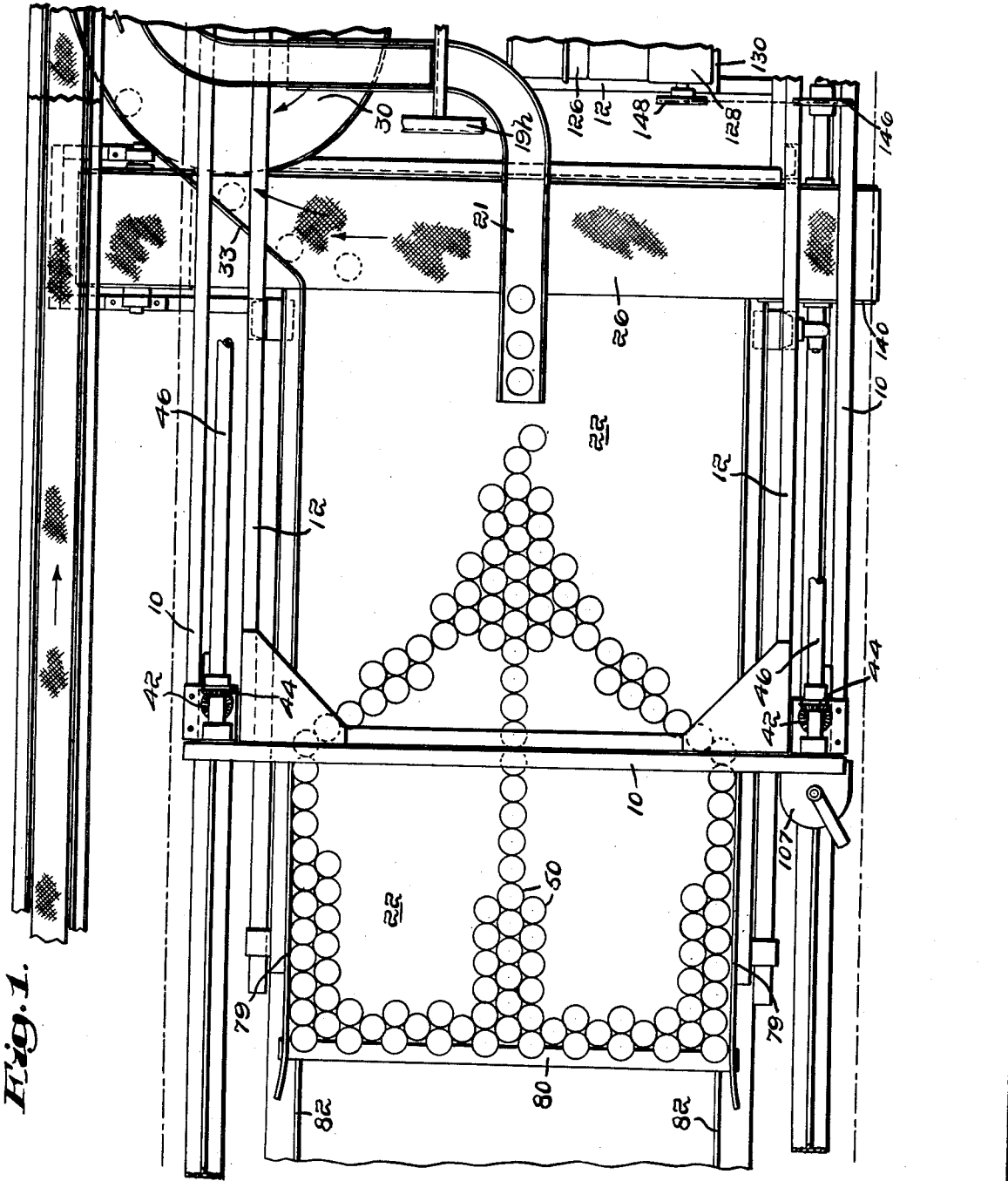

The machine in the embodiment illustrated comprises an outer rectangular frame member 10 having an extension 10a and an inner rectangular frame member 12 which is movable vertically relative to the outer frame member. The machine as a whole is movable over the floor 14 on wheels 16, journaled on stub shafts secured to the base of the frame member 10 and riding on a trackway made up of rails 18 (see Fig. 3). In the stacking operation, cans 50 to be stacked are supplied to the machine as the machine advances to the right (Fig. 2A) by a belt 20, supported by means external of the machine. The cans are delivered (through means subsequently to be described, these means forming part of the machine) to a chute 21 which feeds the cans to an inclined belt 22, paid out by the machine as it advances. This belt, which is anchored at its free end, as to the wall of the warehouse, not shown, is comprised over the major portion of its length of disconnectable sections, the dimensions of which correspond substantially to the length and width of the tiers desired to be laid and is fed from a roll 24 (Fig. 2A) supported, like the chute 21, through the inner frame member 12.

In the starting position of the machine in the laying of a tier, the edge of the wedge-shaped end 27 of the shoe 28, fixed to the inner frame 12 and undersupporting the belt 22, is positioned adjacent the wall to which the end of the belt is anchored. The machine, of course, is not advanced until a full complement of cans has been received on the belt. Once a tier has been laid, the corresponding belt section is disconnected, the inner frame and its associated parts elevated one step i. e., a distance equivalent to the height of the cans, and the machine returned to starting position. Thereafter the belt is re-anchored and the machine again advanced along the belt 20, the process being repeated until the stack has been built up to the desired height. In the finished stack, as should be apparent, the adjacent tiers are separated by a belt section. The belt sections markedly contribute to the stability of the stack by exerting a bridging effect compensating for any tendency on the part of the marginal cans to fall out of the stack when the tiers do not exactly coincide.

The belt 22 may be fabricated of canvas, for example, and the means whereby the sections thereof are rendered interconnectable may take any one of several forms. Thus I may, for example, provide each section with a series of grommets along its margin at the end anchored to the wall and with a series of hooks, complementary with relation to the grommets, along its opposite margin.

In addition to the roll 24 from which the belt 22 is paid out, the inner frame 12 carries an endless belt 26 which comes into play in the unstacking of the cans. This belt is positioned in transverse relation to the line of movement of the belt 22. As the unstacking operation begins, the two belts are at a level corresponding to the height of the stack, belt 22 being inclined just as in Fig. 2. With the lower end of the chute 21 in a position as indicated by the dotted line representation in Fig. 2, the end of the shoe 28 is forced under the belt section on which the top layer of cans is disposed. Then, after the belt section has been reconnected to the main body of the belt 22, the shoe is carried by the machine further into the stack toward the wall to which the belt section is anchored, the belt as a whole being maintained under proper tension during this operation by the winding thereof on the roll 24 at a rate corresponding to the rate of movement of the machine. After the end of the shoe has reached the wall, the belt section is disconnected from the wall and the machine returned to its original position where the inner frame 12 and the appurtenant parts are lowered one step in preparation for the next cycle of operation. Ultimately, each belt section passes over the idler 29, where it loses its load of cans to a slide 31 serving the belt 26. A disc 30, toward which the cans on belt 26 are directed by a deflector 33, transfers the cans to a chute 32 terminating at a point just above a conveyor belt 34 (Fig. 3) serving to transport the cans to any desired location. Depending on the length of the belt sections, a plurality of the sections may have been integrated with the main body of the belt 22 before any cans have reached the belt 26.

The foregoing is believed to suffice as a general description of the operation of the machine and of the functions of certain of the principal parts.

It has doubtless already been observed that I accomplish the necessary raising and lowering of the inner frame 12 by means of screws 36 the lower ends of which are journaled in bearings 38 fixed to the outer frame member 10. These screws pass through internally threaded collars 40 fixed to the inner frame 12. Each has keyed to its upper end a bevel gear 42 which meshes with a bevel gear 44 carried on one of the shafts 46. The shafts 46 are driven by a reversible motor 48 (Fig. 1A) through reduction gears 52 mounted with the motor on a platform 54 supported by extension 10a of the outer frame 10. Power transmission is by sprocket wheel and chain, the output shaft of the reduction gear unit carrying two sprocket wheels 55, each being connected via a chain 59 to a sprocket wheel 57 keyed to the end of one of the shafts 46.

Referring now particularly to the upper right hand portion of Fig. 2A and to Figs. 4–6, it is to be noted that the belt 20 rides on idlers 68 supported by a conveyor frame 61 which is in turn supported by brackets 67 (Fig. 3) fixed as along a row of building columns. As the machine and cans approach each other on stacking operation, the belt passes up over an inclined plane 62 forming part of a plow attachment 64. Such attachment further includes side guards 65 and bracket elements 63. The latter support the side guards and mount wheels 70 which ride on the can-flanking flanges 60 carried by the conveyor frame 61. A support 66 connects the entire assembly to the outer frame 10.

A deflector 72 mounted between the side guards 65 operates to direct the cans into a chute 71 which delivers the cans onto a conveyor belt 19a comprised as part of an assembly generally indicated in the drawings by the numeral 19 (Fig. 2A). The frame of this assembly is pivotally mounted at pulley 19b to a support member 19e fixed to frame section 10a. Drive pulley 19c is carried on a shaft 19f, which is journaled at the end opposite the pulley in an extension member 19g (Fig. 1A). This member finds support in members 19h which are fixed to the inner frame 12. Shaft 19f is driven through a chain 19k linking a sprocket 19j on the shaft and a sprocket 19l on a shaft 132. The latter shaft, which will be hereinafter referred to, is carried by the inner frame 12. The connection between the chute 21 and the assembly 19 allows for raising and lowering of the left-hand end of the assembly with the chute.

The angle of inclination of the belt 22, receiving the cans from the chute 21, is such that the cans, due to their momentum, tend to slide relative to the belt. Thus, as the stacking operation proceeds, a pyramid of the cans forms between the guard rails 79, as shown in Fig. 1, with the result that the cans thereafter delivered by the chute are directed toward one side or the other of the belt. The final alignment of the cans in each tier at the end farthest removed from the warehouse wall must be done by hand or with a suitable pole or rack. Stop guide 80, by means of which the first-laid cans of each tier are aligned, may be fixed, through the arms 82, to standards or other supports, not shown, or to the wall of the warehouse in a manner allowing for its elevation in stepwise fashion as the stack is built-up. As shown, this guide is so formed that the cans are deposited in a staggered pattern with the axes of the staggered rows such that the side rows are unbroken.

It is to be observed that the course of belt 22 after it leaves the feed roll 24 is around and under idler 82, thence under idler 84 beneath the endless belt 26 and finally over idler 29, previously mentioned, onto the surface of the shoe 28. Roll 24 is a driven roll, shaft 86 (Fig. 1A) having keyed thereto a sprocket wheel 88 connected via a chain 90 to a sprocket wheel 92 associated with a friction clutch 108 keyed to a driven shaft 94. The purpose of the friction clutch is to maintain a satisfactory tension on the stacker belt. Shaft 94 is driven through a chain 100, linking sprocket 96 carried by the shaft and sprocket 98 fixed to the output shaft of a reduction gear unit 104 by a variable speed reversible motor 102. This motor and the reduction gear unit 104 are mounted alongside motor 48 and reduction gears 52 on a separate platform 106 supported by section 10a of the main frame 10. Both motors are controlled from a switchbox 107 (Fig. 2) at the opposite end of the machine. Chain 90, driving the belt feed roll 24, is kept under proper tension irrespective of the vertical position of the roll, which is determined by the height of the stack, through a weighted roller 87, pivoted to the frame section 10a at 89.

Fixed oppositely on the shaft 94, just inwardly of the bearings 95 in which the shaft turns, is a pair of sprocket wheels 110, 110' each of which is linked via a chain 118, 118' to a sprocket wheel 112, 112' on a stub shaft 114, 114' journaled in a bearing secured to the frame section 10a. Outward of each sprocket wheel 112, 112' on the stub shaft 114, 114' is a second larger sprocket wheel 116, 116' over which passes a chain 122, 122'. This chain is threaded under idlers 124, 124' on opposite sides of the sprocket wheel 116, 116' and is anchored at either end at suitable points not shown in the drawings.

With the arrangement as just described, it is believed obvious that when the switch controlling the reversible motor 102 is manipulated the machine, as a whole, is caused to move over the rails 18 in a direction determined by the setting of the switch, while the roll 24 is revolved in the opposite direction.

In addition to motors 48 and 102 the machine in the embodiment illustrated includes a third motor 126 mounted with reduction gears 128 on a platform 130 fixed to the inner frame 12. This motor powers the belt 19a comprised in the assembly 19, the disc 30, which serves to deliver the cans to the chute 32 on unstacking operation of the machine and the endless belt 26 supplying the cans to the disc on such operation. Both the disc and the belt 19a are driven through the previously mentioned shaft 132 which mounts a bevel gear 136 (Fig. 3) meshing with a bevel gear 142 on the vertical shaft 144 to which the disc is fixed. Belt 19a, as previously explained, is driven by the shaft 132 through chain 19k and shaft 19f. Shaft 132 carries a gear 134 which meshes with a gear 138 fixed on the shaft 139 of one of the drums 140 around which the belt 26 passes (Fig. 2A). Fixed to this shaft 139 is a sprocket 146 which is linked via a chain 150 to a sprocket 148 on the output shaft of the reduction gear unit 128.

Disc 30 being old per se and its construction being well understood by those skilled in the art, a detailed description thereof does not appear necessary.

Chute 32 which conveys the unstacked cans to the belt 34 is telescoped at 152 so that it shortens as the inner frame 12 is lowered in correspondence with the decreasing height of the stack.

If desired, belt 22 may be formed of paper or cellophane, for instance, rather than a material such as canvas or the like. In such case the belt, on stacking operation, is simply torn or cut after each tier has been laid, while on unstacking, the paper sheets may be interconnected through the use of a fast-drying glue, for example, or by means of specially designed connectors.

It is, of course, possible in stacking to proceed without severing the carrier belt; i. e., the belt may be carried back over the tiers and reanchored without severing. Operating in this way, adjacent tiers in the completed stack are separated by two thicknesses rather than a single thickness of the belt material. To unstack such a stack using the machine, the procedure is as hereinbefore described except for the severing and reconnecting necessary incident to integration of the double sheets with the body of the belt.

It is to be understood that the details of structure and arrangement of parts shown may be variously changed and modified in ways not specifically mentioned herein without departure from the spirit and scope of my invention.

I claim:

1. In a machine for stacking objects stackable in tiers or layers, a frame member movable both horizontally and vertically, positive tensioning means associated with said frame member for paying out sheet material under tension as said member is moved horizontally in one direction and means for depositing the objects to be stacked on said tensioned sheet material as it is paid out.

2. In a machine for stacking objects stackable in tiers or layers, a pair of frame members linearly movable horizontally as a unit, one of said members being movable vertically relative to the other, driven tensioning means associated with said vertically movable frame member for paying out a downwardly inclined belt under tension as said members are moved horizontally in one direction and means for depositing the objects to be stacked on said tensioned belt as it is paid out.

3. In a machine for stacking objects stackable in tiers or layers, a pair of frame members linearly movable horizontally as a unit, one of said members being movable vertically relative to the other, driven means for effecting horizontal linear movement of said members, tensioning roll means associated with said vertically movable frame member for paying out under tension a downwardly inclined belt severable into sections corresponding with the length and width of the tiers as said members are moved horizontally in one direction and means for depositing the objects to be stacked on said tensioned belt as it is paid out.

4. In a machine for stacking objects stackable in tiers or layers, a pair of frame members linearly movable horizontally as a unit, one of said members being movable vertically relative to the other, driven means associated with the other of said members for effecting horizontal linear movement of said members, tensioning roll means associated with said vertically movable frame member for paying out under tension a downwardly inclined belt severable into sections corresponding with the length and width of the tiers as said members are moved horizontally in one direction and means for depositing the objects to be stacked on said tensioned belt as it is paid out.

5. In a machine for stacking objects stackable in tiers or layers, a pair of frame members linearly movable horizontally as a unit, one of said members being movable vertically relative to the other, driven means associated with the other of said members for effecting horizontal linear movement of said members, a driven tensioning roll associated with said vertically movable frame member for paying out under tension a downwardly inclined belt severable into sections corresponding with the length and width of the tiers as said members are moved horizontally in one direction and chute means for depositing the objects to be stacked on said tensioned belt as it is paid out.

6. In a machine for stacking objects stackable in tiers or layers, a pair of frame members linearly movable horizontally as a unit, one of said members being positioned inwardly of the other and being vertically movable, driven means associated with the outer frame member for effecting horizontal linear movement of said members, power means supported by the outer frame member for driving said driven means, a driven tensioning roll supported from the inner frame member for paying out under tension a downwardly inclined belt severable into sections corresponding with the length and width of the tiers as said members are moved horizontally in one direction and chute means for depositing the objects to be stacked on said tensioned belt as it is paid out.

7. In a machine for stacking objects stackable in tiers or layers, an outer frame member and an inner frame member linearly movable horizontally as a unit, said inner frame member being vertically movable relative to said outer frame member, driven means associated with said outer frame member for effecting horizontal linear movement of said members, a driven tensioning roll supported from said inner frame member for paying out under tension a downwardly inclined belt severable into sections corresponding with the length and width of the tiers as said members are moved horizontally in one direction, power means mounted on said outer frame member for driving said driven means and said driven roll and chute means for depositing the objects to be stacked on said tensioned belt as it is paid out.

8. In a machine for stacking objects stackable in tiers or layers, an outer frame member and an inner frame member linearly movable horizontally as a unit, said inner frame member being vertically movable relative to said outer frame member, driven means associated with said outer frame member for effecting horizontal linear movement of said members, a driven tensioning roll supported from said inner frame member for paying out under tension a downwardly inclined belt severable into sections corresponding with the length and width of the tiers as said members are moved horizontally in one direction, power means mounted on said outer frame member for driving said driven means and said driven roll, a shoe member associated with said inner frame member in position to undersupport said tensioned belt and chute means for depositing the objects to be stacked on said tensioned belt as it is paid out.

9. In a machine for stacking objects stackable in tiers or layers, an outer frame member and an inner frame member linearly movable horizontally as a unit, said inner frame member being vertically movable relative to said outer frame member, driven means associated with said outer frame member for effecting horizontal linear movement of said frame members, driven means for effecting vertical movement of said inner frame member, a driven tensioning roll for paying out under tension a downwardly inclined belt severable into sections corresponding with the length and width of the tiers as said members are moved horizontally in one direction, power means supported through said outer frame member for driving said first-mentioned driven means and said driven roll, separate power means supported through said outer frame member for driving said second-mentioned driven means, a shoe member associated with said inner frame member in position to undersupport said tensioned belt and chute means for depositing the objects to be stacked on said tensioned belt as it is paid out.

10. In a machine for unstacking stacked objects, the objects being arranged in superposed layers, each pair of adjacent layers being separated by sheet material extraneously anchored at one end of the stack, the combination with wedge means adapted to be forced under the unanchored ends of the sheet material sequentially from the top to the bottom of the stack, of means for carrying the wedge toward the anchored end of the sheet material at each level, means for maintaining the sheet material suitably tensioned during such operation and for removing the sheet material and the layer of objects thereon from the surface of the wedge on unanchoring of the sheet material.

11. In a machine for unstacking stacked objects, the objects being arranged in superposed layers, each pair of adjacent layers being separated by a section of sheet material extraneously anchored at one end of the stack, the combination with wedge means adapted to be forced under the unanchored end of the sections sequentially from the top to the bottom of the stack, of means for carrying the wedge toward the anchored end of the section at each level, means for maintaining the section suitably tensioned during such operation and for removing the section and the layer of objects thereon from the surface of the wedge on unanchoring of the section, and conveyor means positioned and arranged to receive the objects from the section and to transport the same to a point of discharge.

12. In a machine for unstacking stacked objects, the objects being arranged in superposed layers, each pair of adjacent layers being separated by a section of sheet material extraneously anchored at one end of the stack, the combination with wedge means adapted to be forced under the unanchored end of the sections sequentially from the top to the bottom of the stack, of means for carrying the wedge toward the anchored end of the section at each level, belt means for maintaining the section suitably tensioned during such operation and for removing the section and the layer of objects thereon from the surface of the wedge on unanchoring of the section and return of the wedge to a normal position outward of the stack, and an endless conveyor belt positioned in transverse relation with respect to said first belt means and arranged to receive the objects from the section for transport to a point of discharge.

13. A machine according to claim 12 in which the sections become integrated with said first-mentioned belt means.

14. In a machine for unstacking stacked objects, the objects being arranged in superposed layers, each pair of adjacent layers being separated by a section of sheet material extraneously anchored at one end of the stack, a pair of frame members linearly movable horizontally as a unit, one of said members being movable vertically relative to the other, wedge means associated with the vertically movable frame member, said means in operation of the machine being forced under the unanchored ends of the sections sequentially from the top to the bottom of the stack and being carried toward the anchored end of the section at each level, and means associated with the vertically movable frame member for maintaining the section suitably taut during the latter operation and for removing the section and the layer of objects thereon from the surface of the wedge on unanchoring of the section.

15. In a machine for unstacking stacked objects, the objects being arranged in superposed layers, each pair of adjacent layers being separated by a section of sheet material extraneously anchored at one end of the stack, a pair of frame members linearly movable horizontally as a unit, one of said members being movable vertically relative to the other, wedge means associated with the vertically movable frame member, said means in operation of the machine being forced under the unanchored ends of the sections sequentially from the top to the bottom of the stack and being carried through movement of the entire machine toward the anchored end of the section at each level, and belt means associated with the vertically movable frame member for maintaining the section suitably taut during the latter operation and for removing the section and the layer of objects thereon from the surface of the wedge on unanchoring of the section and return of the wedge to a normal position outward of the stack.

16. In a machine for unstacking stacked objects, the objects being arranged in superposed layers, each pair of adjacent layers being separated by a section of sheet material extraneously anchored at one end of the stack, a pair of frame members linearly movable horizontally as a unit, one of said members being positioned inward of the other and being vertically movable, wedge means associated with the inner frame member, said means in operation of the machine being forced under the unanchored ends of the sections sequentially from the top to the bottom of the stack and being carried through movement of the entire machine toward the anchored end of the section at each level, belt means associated with the inner frame member for maintaining the section suitably taut during the latter operation and for removing the section and the layer of objects thereon from the surface of the wedge on unanchoring of the section and return of the wedge to a normal position outward of the stack and conveyor means supported through the inner frame member in position to receive the objects from the section and to transport the same to a point of discharge.

17. A machine according to claim 16 in which the conveyor means takes the form of an endless belt.

18. A machine according to claim 16 in which the sections become integrated with said belt means.

19. A machine for assembling objects stackable in superposed tiers into a stack stabilized by sheet material interposed between adjacent tiers and for unstacking objects so stacked which utilizes the said material as a carrier for the objects, the machine comprising in combination a frame member linearly movable horizontally, a plow member underlying the sheet material both in stacking and unstacking operation of the machine, said plow member having a tapered edge readily enterable between superposed tiers in unstacking operation, and driven tensioning means for paying out the sheet material under tension in stacking operation and for drawing in the sheet material under tension in unstacking operation.

RICHARD M. BOTLEY.

References Cited in the file of this patent

UNITED STATES PATENTS

| Number | Name | Date |
|---|---|---|
| 972,649 | Rose | Oct. 11, 1910 |
| 1,220,375 | Tanner | Mar. 27, 1917 |
| 2,065,674 | Fay | Dec. 29, 1936 |
| 2,135,805 | Evans | Nov. 8, 1938 |
| 2,186,463 | Maine | Jan. 9, 1940 |
| 2,237,345 | Frentzel | Apr. 8, 1941 |
| 2,437,214 | Trembloy | Mar. 2, 1948 |